(12) United States Patent
Johnson et al.

(10) Patent No.: US 11,799,893 B2
(45) Date of Patent: *Oct. 24, 2023

(54) CYBERSECURITY DETECTION AND MITIGATION SYSTEM USING MACHINE LEARNING AND ADVANCED DATA CORRELATION

(71) Applicant: PayPal, Inc., San Jose, CA (US)

(72) Inventors: Brian Johnson, Queen Creek, AZ (US); Bradley Wardman, Phoenix, AZ (US); Nathan Pratt, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,865

(22) Filed: Dec. 28, 2021

(65) Prior Publication Data

US 2022/0124111 A1 Apr. 21, 2022

Related U.S. Application Data

(63) Continuation of application No. 16/289,299, filed on Feb. 28, 2019, now Pat. No. 11,297,078.

(51) Int. Cl.
*H04L 9/40* (2022.01)
*G06F 21/31* (2013.01)
(Continued)

(52) U.S. Cl.
CPC ........ *H04L 63/1425* (2013.01); *G06F 21/316* (2013.01); *G06N 5/025* (2013.01);
(Continued)

(58) Field of Classification Search
CPC . H04L 63/1425; H04L 63/102; H04L 63/101; G06N 5/025; G06N 20/00; G06F 21/554; G06F 21/316
See application file for complete search history.

(56) References Cited

U.S. PATENT DOCUMENTS

| | | |
|---|---|---|
| 9,166,993 B1 | 10/2015 | Liu |
| 2009/0292743 A1* | 11/2009 | Bigus ................ G06F 21/316 |

(Continued)

OTHER PUBLICATIONS

Y. Hu, C. Frank, J. Walden, E. Crawford and D. Kasturiratna, "Profiling file repository access patterns for identifying data exfiltration activities," 2011 IEEE Symposium on Computational Intelligence in Cyber Security (CICS), Paris, France, 2011, pp. 122-128, doi: 10.1109/CICYBS.2011.5949404. (Year: 2011).*

(Continued)

*Primary Examiner* — Robert B Leung
(74) *Attorney, Agent, or Firm* — Haynes and Boone, LLP (57) ABSTRACT

Computer system security is often implemented using rules-based systems (e.g., allow traffic to this network port, deny it for those network ports; user A is allowed access to these files, but not those files). In enterprises, multiple such systems may be deployed, but fail to be able to intelligently handle anomalies that may technically be permissible but in reality represents a high possibility that there is an underlying threat or problem. The present disclosure describes the ability to build adaptive models using machine learning techniques that integrate data from multiple different domains (e.g. user identity domain, system device domain) and allow for automated decision making and mitigation actions that can provide greater effectiveness than previous systems allowed.

20 Claims, 4 Drawing Sheets

(51) Int. Cl.
*G06N 20/00* (2019.01)
*G06N 5/025* (2023.01)

(52) U.S. Cl.
CPC ........... *G06N 20/00* (2019.01); *H04L 63/101* (2013.01); *H04L 63/102* (2013.01)

(56) References Cited

U.S. PATENT DOCUMENTS

| | | |
|---|---|---|
| 2010/0122120 A1 | 5/2010 | Lin |
| 2016/0142435 A1 | 5/2016 | Bernstein et al. |
| 2016/0149941 A1* | 5/2016 | Thakur ............... G06F 16/2465 726/23 |
| 2016/0197947 A1 | 7/2016 | Im et al. |
| 2017/0126710 A1 | 5/2017 | De-Levie et al. |
| 2017/0134412 A1 | 5/2017 | Cheng et al. |
| 2017/0339178 A1 | 11/2017 | Mahaffey et al. |
| 2018/0288063 A1 | 10/2018 | Koottayi et al. |
| 2018/0293377 A1* | 10/2018 | Tomonaga ............. G06N 20/10 |
| 2019/0188065 A1 | 6/2019 | Anghel et al. |
| 2020/0076768 A1 | 3/2020 | Eshghi |
| 2020/0120135 A1* | 4/2020 | Hu ........................ H04L 63/105 |
| 2020/0274894 A1 | 8/2020 | Argoeti et al. |

OTHER PUBLICATIONS

Petrov D., et al., "Context-Aware Deep Learning-Driven Framework for Mitigation of Security Risks in BYOD-Enabled Environments," IEEE 4th International Conference on Collaboration and Internet Computing (CIC), 2018, doi: 10.1109/CIC.2018.00032 (Year: 2018), 10 pages.

Sahin C. et al., "Data Security and Privacy for Outsourced Data in the Cloud", Mar. 21-24, 2017, Venice, Italy, ISSN :2367-2005, open proceedings, Tutorial, 4 pages.

Yang K. et al., "A Light-Weight Solution to Preservation of Access Pattern Privacy in Un-trusted Clouds", Proceedings of the 16th European conference on Research in computer security, Sep. 12-14, 2011, pp. 528-547.

* cited by examiner

CYBERSECURITY DETECTION AND MITIGATION SYSTEM USING MACHINE LEARNING AND ADVANCED DATA CORRELATION

CROSS REFERENCE TO RELATED APPLICATIONS

The present application is a continuation application of U.S. patent application Ser. No. 16/289,299, filed Feb. 28, 2019, and is incorporated in reference in its entirety.

TECHNICAL FIELD

This disclosure relates to improvements in computer system security that allow for better detection and mitigation of cybersecurity attacks and risks, in various embodiments.

BACKGROUND

Computer systems contain vast amounts of data and enable a wide spectrum of functionality. Enterprises often control computer systems that are accessible to the public Internet, which brings potential security risks. Internal computer systems (e.g. behind a firewall or otherwise at least partly inaccessible via a network connection) also pose various security risks. Such risks (both external and internal) can result in unauthorized use of computing resources, unauthorized actions being taken, unauthorized access to particular data, and/or unauthorized physical access.

Such security risks can compromise operational integrity. Existing detection systems may attempt to avoid certain security risks, but frequently suffer from an inability to correlate information across multiple different domains, and thus may fail to detect and/or mitigate certain attacks or risks.

DETAILED DESCRIPTION

Techniques are described relating to the active mitigation of security risks that are detected from a combined analysis of risky users and compromised systems, something that is not available on the market today. Simply using either machine systems security or identity and access restrictions, for example, is not a fully adequate solution.

The mitigation of attacks and risks based on a combined view of systems security along with identity and access restrictions can be accomplished using a complete Enterprise Cybersecurity Defense System (eCDS). Such an eCDS can provide methods and design elements necessary to build a complete system capable of active defenses and mitigation of non-prescribed and dynamically detected cyberattacks. Such a system can be useful to entities such as PayPal™, and other individuals and corporations.

Enterprise security systems may be used by companies with an identity and access management system (IAM) and machine endpoint detection and response or protection systems (EDR), including antivirus (AV), data loss prevention (DLP), antimalware and correlation or security event and incident management (SEIM) systems. A premise outlined in this disclosure is predictive detection of access patterns, matching of identity and behaviors by machine learning to prevent malicious activities. A use case for this idea is to build middle-brain like methods for decision support, active defense, and mitigation methods necessary not only to detect or policy restrict based on pre-defined threats, but connect active detection with adaptive mitigation.

Further, data and information protection methods to prevent data breaches are in some cases only achieved through encryption and other predefined data manipulation methods. Data encryption can be difficult and costly to scale, manage and maintain, especially as organizations increase the breadth and complexity of information they store, and in view of storage technologies, adoption of cloud hosting, and how database platforms may quickly evolve beyond encryption solutions. Data protection solutions need not necessarily rely on the technical implementation of physical data, but instead can use patterns for security and protection based on the logical design elements of data schemas, structure and access patterns. Such protection patterns can be determined as a set of adaptively enforced policies and permissions from supervised and learned access and usage of database systems.

Thus, in various embodiments described herein, data may be integrated from multiple domains (e.g. user identity, system logs) into a machine learning based solution that can recognize anomalous attempts to access electronic resources. These anomalous attempts may not be recognized by a simple rules-based system as something that is potentially problematic—e.g., a firewall may be configured to allow access to certain communication ports, or a particular user may have access to a wide variety of files and relational databases. However, a statistically unlikely (e.g. anomalous) access attempt may still be indicative of an underlying security issue, even if such an access might have been permitted under a rules-based system.

Instead, the presently described system may build a user behavior model and a system access model to determine patterns of access and analyze access records and characteristics of electronic resources that are being used. These models can then make a determination as to whether a particular access attempt is anomalous. If the attempt is anomalous, one or more mitigation actions can be taken according to a mitigation model, such as restricting or denying access, issuing an alert, increasing logging, or any number of other actions. Further, outcomes of the mitigation actions can be tracked, improving the response of the mitigation model as it continues to evolve and update.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not powered on). Reciting that a component is "configured to" perform one or more tasks is expressly intended not to invoke 35 U.S.C. § 112(f) for that component.

Figure 1:
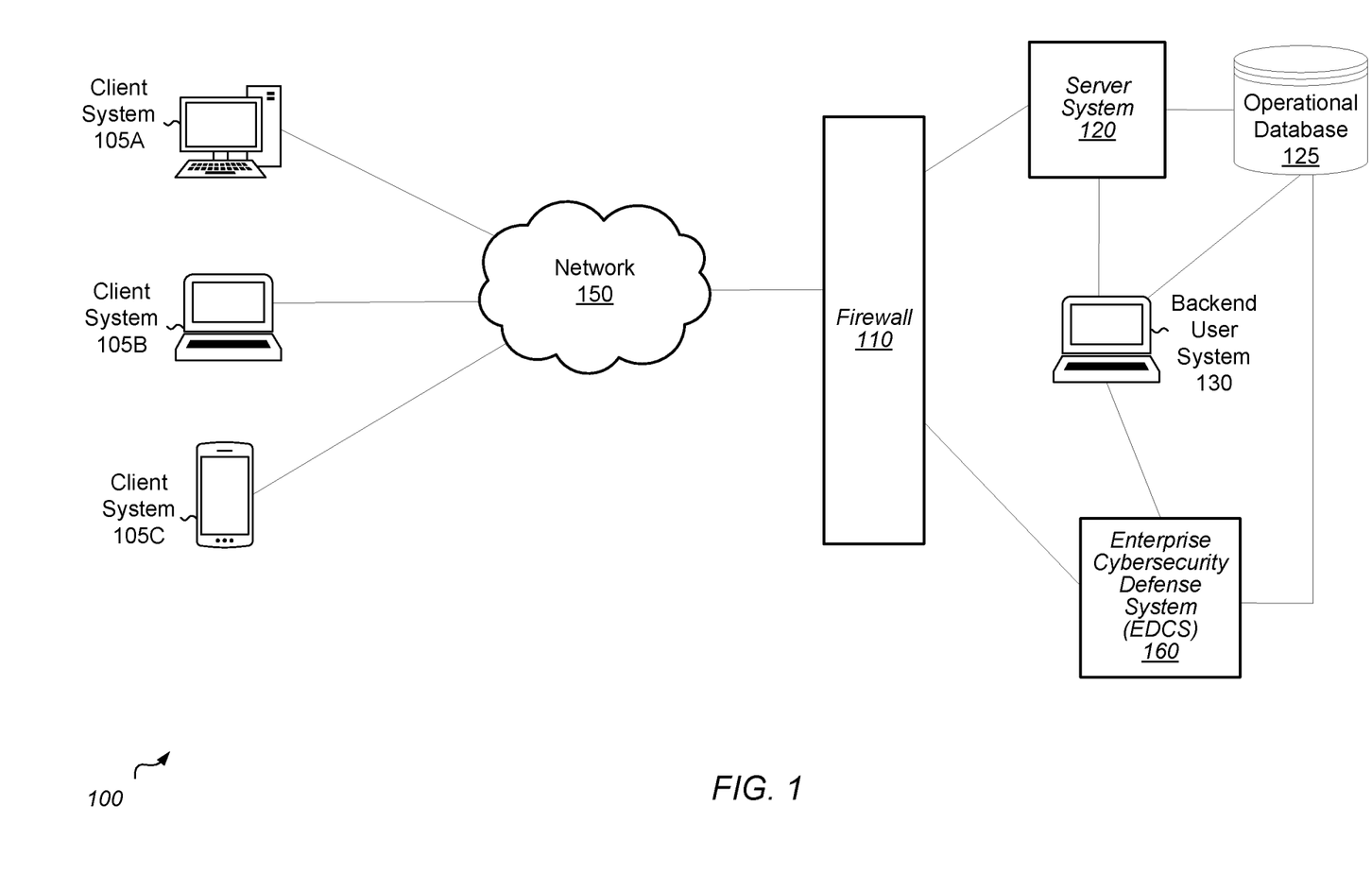
FIG. 1 illustrates a block diagram of a system including client systems, a network, and an enterprise cybersecurity defense system, according to some embodiments.

Turning to FIG. 1, a block diagram of a system 100 is shown. In this diagram, system 100 includes client systems 105A, 105B, and 105C. System 100 also includes server system 120, operational database 125, backend user system 130 enterprise cybersecurity defense system (EDCS) 160, firewall 110, and network 150.

Note that many other permutations of this figure are contemplated (as with all figures). While certain connections are shown (e.g. data link connections) between different components, in various embodiments, additional connections and/or components may exist that are not depicted. As will be appreciated, large numbers of devices are omitted from this diagram for simplicity—thus, in various embodiments, routers, switches, load balancers, computing clusters, additional databases, servers, and firewalls, etc., may all be present. Components may be combined with one another and/or separated into one or more systems in this figure, as in other figures.

Note that EDCS 160 is shown as being connected to firewall 110, backend user system 130, and operational database 125, but this architecture is only an example. EDCS 160 can be connected to server system 120 and other devices as well (i.e., a number of different devices may send and receive data and/or commands with EDCS 160). In some instances, other monitoring systems not depicted (such as an Intrusion Detection System, for example) may feed data to EDCS 160. In short, EDCS 160 may be configured to receive and access data relating to performance and security of any device residing on a network, in various embodiments, and such data may come from multiple sources. EDCS 160 may comprise one or more computing devices in various embodiments and can be hosted in a cloud environment or other compute cluster environment in some embodiments.

User systems 105A, 105B, and 105C may be any user computer system that can potentially interact with server system 120. Server system 120 may facilitate one or more services, such as account access and electronic payment transactions (as may be provided by PayPal.com™). Server system 120 may thus also facilitate access to various electronic resources, which can include an account, data, programs/functionality, etc.

Server system 120 may be any computing device configured to provide access to electronic resources. This can include providing web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to operational database 125. Operational database 125 may include various data, such as user account data, system data, and any other information. Multiple such databases may exist, of course, in various embodiments, and can be spread across one or more data centers, cloud computing services, etc. Server system 120 may comprise one or more computing devices each having a processor and a memory. Network 150 may comprise all or a portion of the Internet.

Server system 120 may correspond to an electronic payment transaction service such as that provided by PayPal™ in some embodiments. Server system 120 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via server system 120, including but not limited to stocks, commodities, gift cards, incentive points (e.g. from airlines or hotels), etc. Server system 120 may also correspond to a system providing functionalities such as API access, a file server, or another type of service with user accounts in some embodiments (and such services can also be provided via content server system 120 in various embodiments).

Operational database 125 can include a transaction database having records related to various transactions taken by users of a transaction system in the embodiment shown. These records can include any number of details, such as any information related to a transaction or to an action taken by a user on a web page or an application installed on a computing device (e.g., the PayPal app on a smartphone). Many or all of the records in transaction database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity).

Figure 2:
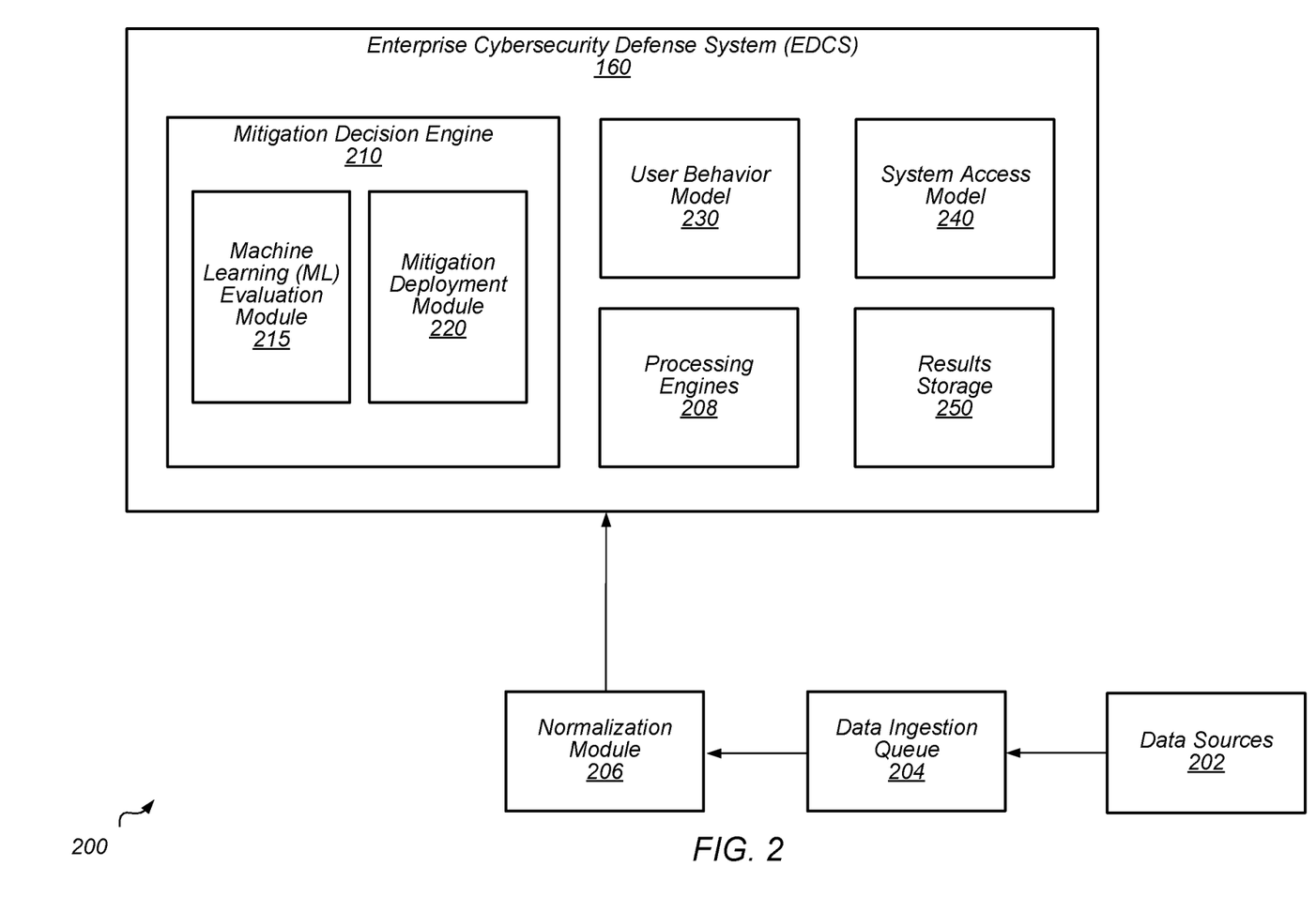
FIG. 2 illustrates a diagram relating to further details of an enterprise cybersecurity defense system, according to some embodiments.

Turning to FIG. 2, a diagram is shown of an embodiment of a system 200 relating to Enterprise Defense Cybersecurity System (EDCS) 160. As depicted, data flows from one or more data sources 202 (hereafter "data sources 202") to a data ingestion queue 204 and then to a normalization module 206 before being sent to EDCS 160.

Data sources 202 may include any number of data repositories, including enterprise databases, intrusion detection systems, firewalls, routers, traffic balancers, credit bureau reporting services or other third-party databases (e.g. databases owned and/or maintained by an entity other than an entity corresponding to EDCS 160), system access logs, logs of electronic access to areas of physical buildings, etc. Particular data is discussed in some further examples below. Data ingestion queue 204 may store incoming data as a buffer, and normalization module may process data into a uniform style (e.g. data may be harmonized between disparate sources; if one security software vendor reports a qualitative data on a scale of 1-10 while a second security software vendor reports similar qualitative data on a scale of 1-5, the second sets of data from the second vendor may have their values doubled (e.g. to normalize the values). (Of course, many such different normalization operations are possible and contemplated.) In some instances, queue 204 and/or normalization module 206 may be omitted if not needed. They may also be included as a part of EDCS 160 (but are shown separately in the figure for ease of explanation).

EDCS 160 includes one or more processing engines 208 (hereafter "processing engines 208") that operate on data received from normalization module 206. Processing engines 208 may make calculations using the data resulting in a quantized vector containing values suitable for further evaluation (e.g. using a machine learning algorithm). One or more autoencoders, for example, can be trained on known (or believed to be) "good" data indicating normal, non-problematic usage. These autoencoders can be used to build user behavior model 230 and system access model 240 (which may rely on any and all available data, but user behavior model 230 may tend to focus (or exclusively focus) on specific kinds of data relating to actions taken by a user, while system access model 240 may tend to focus (or exclusively focus) on specific kinds of data relating to actions that occurred at a particular computer system or other device).

User behavior model 230 can be built up using individual user behavior as well as various cohort behaviors. Consider the example of someone working in a factory that builds automobiles. The factory may have different workers performing different functions; some of these workers may ordinarily use computer systems in their jobs while others may not. Some workers are supervisors to other personnel, others are not. Workers may be ordinarily present at the factory during different working hours (e.g. first shift 7 am-3 pm; second shift 3 pm-11 pm; third shift 11 pm to 7 am). User behavior model 230 can be established using all of this detail. Some information may be established proscriptively (e.g., facts may be known about particular workers, like Worker A is a supervisor having four direct employees under her, while Worker B is not a supervisor but is supervised by Worker A). The factory may be owned by an automotive company having different locations (factory and non-factory) around the world. User actions at all such sites can be observed and collected, and from such data, user behavior model 230 can be built. Once constructed, user behavior model 230 can provide analysis on patterns of behavior for both individuals and for groups of individuals.

System access model 240 can be built using various system-level data relating to a number of different devices. Such data may include system log data collected by a number of different agents installed on computers throughout a network (e.g. server systems or workstations), switches, mobile phone devices, physical access devices such as electronic locks (or computer systems connected to such access devices that log data relevant to them) or any other type of electronic device. Once constructed, system access model 240 can provide analysis on patterns of usage and access for various individual devices as well as groups of devices.

Mitigation decision engine 210 may use the user behavior model 230 and the system access model 240 to make decisions on whether or not a particular data pattern should be acted upon (e.g. if a computer security risk or other risk may be present). Mitigation decision engine 210 can also decide what form one or more mitigation actions should take. For example, mitigation decision engine 210 might suspend access to an electronic or physical resource, implement an IP-blocking or traffic throttling scheme, increase logging for a particular system or group of systems, generate an alert for human review, or take any other number of actions.

Machine learning (ML) evaluation module 215 is a trained artificial neural network (or another type of machine learning setup) that can make a decision based on a particular set of data relating to one or more real-world events. Mitigation deployment module 220 is configured to interface with a variety of devices in order to carry out one or more mitigation actions that may be required in response to events. Mitigation deployment module 220 will take action automatically, in many embodiments, without human intervention or approval being needed based on particular circumstances. This can provide a significant advantage over other systems that may require a human to review an alert or otherwise initiate a mitigation action.

One factor that makes such an automatic decision-making process possible is that results storage 250 is a data repository configured to record data relating to mitigation actions chosen by mitigation decision engine 210, and results of those mitigation actions. Machine learning is then used to determine if the mitigation action was effective, and may quantify the extent to which the action was effective in solving a problem or potential problem. Human intervention, of course, is still possible even when mitigation deployment module 220 takes an action. If the decision engine makes an ineffective mitigation action, as indicated later by data collected in results storage 250, the system will learn from the apparent mistake, and be less inclined to take such a decision in the future. By constantly measuring and refining mitigation actions using machine learning/artificial intelligence techniques, performance of mitigation decision engine 210 is constantly evolving and improving.

Figure 3:
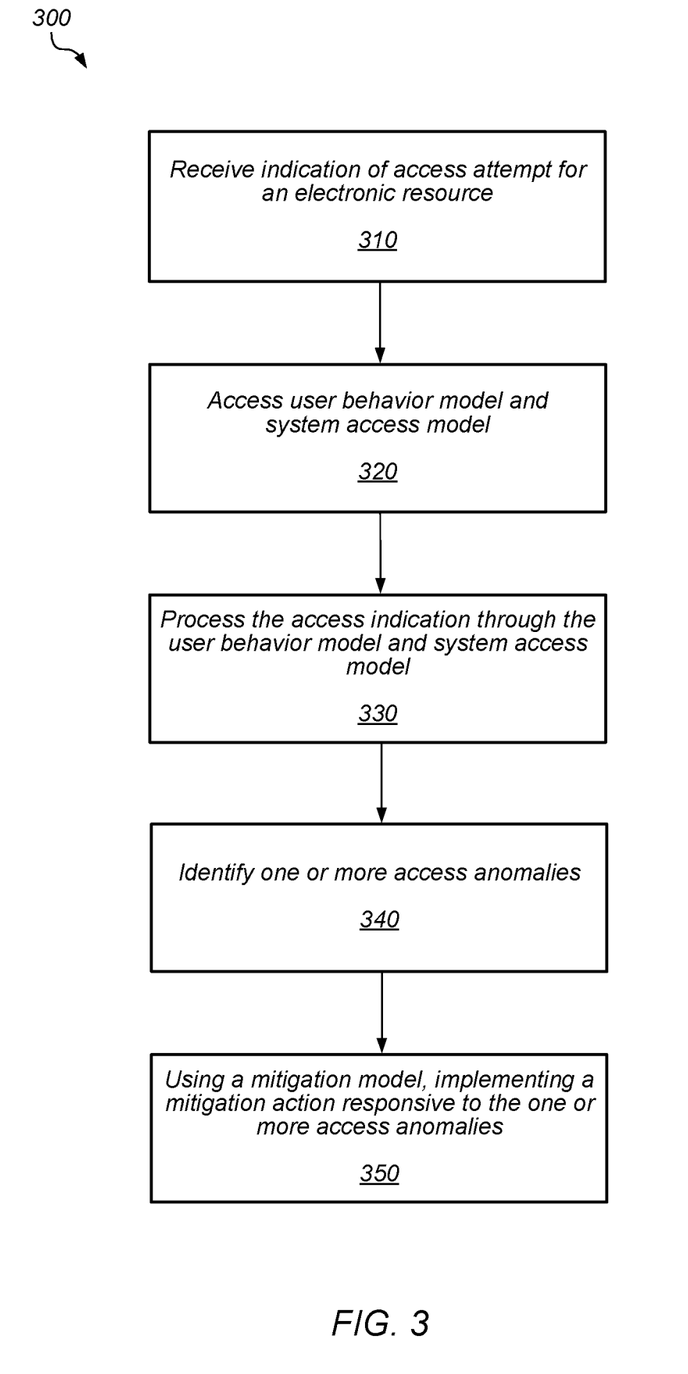
FIG. 3 illustrates a flow diagram of a method that relates to using a user behavior model and a system access model to implement a mitigation action based on a detected access anomaly, according to some embodiments.

Turning to FIG. 3, a flowchart is shown of one embodiment of a method 300 relating to using a user behavior model and a system access model to implement a mitigation action based on a detected access anomaly, according to some embodiments.

Operations described relative to FIG. 3 may be performed, in various embodiments, by any suitable computer system and/or combination of computer systems, including EDCS 160. For convenience and ease of explanation, operations described below will simply be discussed relative to EDCS 160 rather than any other system. Further, various elements of operations discussed below may be modified, omitted, and/or used in a different manner or different order than that indicated. Thus, in some embodiments, EDCS 160 may perform one or more aspects described below, while another system might perform one or more other aspects.

In operation 310, EDCS 160 receives a particular access indication of a particular access attempt to an electronic resource by a particular user, according to various embodiments. The access indication may be in the form of data sent to EDCS (e.g. data originating at data sources 202 and possibly processed via ingestion queue 204 and normalization module 206).

The access attempt in operation 310 as well as the electronic resource can be a wide range of actions and resources. An electronic resource in this context may refer to a particular hardware and/or software component, and can include various physical devices having an electronic component. Thus, the electronic resource may include a particular server system and/or a service running on that system (e.g. a web server such as APACHE™, a remote login service such as secure shell (SSH)). The electronic resource can include an application running on top of another service, for example, a web application enabling payment of currency that is running on top of a web server. An electronic resource may also include a firewall, proxy server, network traffic balancer, workstation, network switch, etc.

The electronic resource can also include other physical objects having electronic connections and/or components, such as a backup power supply that can be remotely managed via a network connection. The electronic resource can also include a physical location access device, such as a door that will only open when presented with the credentials of an authorized user (e.g. a door to a building or campus, or a door to a server room within that building). The electronic resource is not limited to these examples, however. Purely physical devices with no electronic components or connections are not electronic resources within the scope of this disclosure, however—so a key-operated padlock, or a human security guard, for example, would not be an electronic resource.

The access attempt itself may also take many forms and will frequently correspond to the type of electronic resource for which access is being attempted. In the case of a web application, the access attempt may include an initial log-on, where a user provides an account identifier (e.g. user name) and one or more authorization credentials (e.g. a password, biometric, text message one-time code, etc.). The access attempt may also include accessing particular resources within an application (e.g. phone app, web app, or other), such as attempting to transfer funds after an initial authentication, change a mailing address associated with an account, change a password, add a funding instrument (e.g. new debit card), etc. Thus, an access attempt may be an attempt to use particular functionality of various types of software. The access attempt may be associated with particular authentication credentials (e.g. a username or a phone number for a particular account or other identifier), and depending on the access attempt, may not have an associated particular identifier (e.g. an anonymous access).

Access attempts can include accessing particular files, either locally on a system or remotely via a network (e.g. file server and/or cloud storage). Access attempts can include accessing database storage (e.g. executing a query against a relational database which may read and/or modify data in the database). Changing file permissions or other file attributes (e.g. changing a name) can also be classified as an access attempt. Copying or executing a file, locally or remotely, may also be an access attempt.

There are many different types of actions that may be considered an access attempt. All such access attempts may be logged by one or more systems (e.g. by a local operating system, intrusion detection system, firewall, network storage device, etc.). Both successful and unsuccessful attempts may be logged, which can be in real-time and/or in batch records. All such data may be forwarded to EDCS 160 for analysis.

In operation 320, EDCS 160 accesses user behavior model 230 and system access model 240 responsive to a particular access indication, according to various embodiments (although in some embodiments EDCS 160 may access only one of these models). Accessing these models is a precursor to using them in following steps to make determinations regarding an access attempt, according to various embodiments.

User Behavior Model

User behavior model 230 is based on previously-received indications of previous access attempts by a plurality of users for a plurality of electronic resources, according to various embodiments. As such, user behavior model 230 may be based on hundreds, thousands, millions, or more actions taken by any number of users. Access attempts can be logged and aggregated from disparate data sources to build profiles of particular users and/or groups of users. Such profiles can be constructed using machine learning techniques to reveal patterns that would be difficult or in some cases even impossible to detect using human analysis or analysis based on rules (an approach that may be taken by other computer security systems).

Access attempts may have a variety of associated data. In some embodiments, previously-received indications of previous access attempts may include, for ones of a plurality of users, a user identifier corresponding to a user account associated with the access attempt. This may be a username or other information that uniquely identifies a user. Access attempts may include a user's level of access identifier associated with the user account (e.g. whether the user has admin rights on a system or a domain), whether the user is a supervisor of employees or is not a supervisor of other employees, or any other designation of level of privilege associated with a user. Access attempts can include a device identifier corresponding to a particular device used to attempt access, such as an IP address, a device name, a MAC address, a unique hardware fingerprint derived from multiple hardware and/or software characteristics of a machine, etc. Access attempts may have a specific time and/or time period associated with the access attempt, or an access location associated with the access attempt (e.g. work location, home location, extranet vs intranet, geographical location, location within a particular building such as floor 3, west door, etc.). Access attempts may also have a result of the access attempt (e.g. whether a user was granted full, partial, or no access to an electronic resource). Not all such access attempts must have all of the above-listed indicator data, and may include any combination of one or more of these items (as well as other data types not specified in the above paragraph). User behavior model 230 may thus include expected user access profiles for ones of a plurality of users based on previously-received indications of access attempts, and identifying one or more access anomalies may be based on a comparison between the particular access indication to the expected user access profiles.

System access model 240 is based on access records and system characteristic data for one or more particular electronic resources, according to various embodiments. Access records for a particular system may include any access attempts made relative to resources controlled by that system. File access, application access, network ports accessed (e.g. packets sent to a particular TCP/IP port, UDP port, or other port on a system) may all be logged. From such data, system profiles can be built.

System Access Model—Access Records

As just one example relating to access records, analysis may reveal that of all server systems running a particular application service XYZ, 90% of data packets received at those server systems are received at TCP/IP port 443, 8% are received at TCP/IP port 557, 0.1% are received at TCP/IP port 12442, and 1.9% are received at other ports.

If a particular system running service XYZ shows that in a recent period (e.g. last hour, last six hours, last 10 minutes, or some other time period) that 0.8% of its packets were received at TCP/IP port 12442, this may indicate an anomaly—particularly if other similarly configured systems did not experience this network traffic growth (800% relative growth) in the same time period. A naïve detection system that has a rule showing it is acceptable for a server system to receive traffic on port 12442 may simply miss such an anomaly, but a machine learning based system can recognize that this pattern is aberrant, even while it may consistent of traffic that appears destined for a port in legitimate use.

System access records may thus relate to various actions occurring relative to particular devices—interactions with them via a network and/or remote applications, as well as locally occurring actions. These actions may in some cases also be associated with a particular user (e.g., a system might have a record that a particular userID logged into that system. But in other cases, system access records may not be tied to any specifically identifiable individual. As an example, a service account (not tied to a specific human individual) for a web application X accesses a database Table 3 on an hourly basis from one of six servers, and usually performs a query and update on 10 or less rows on that database table. However, regardless of whether it was a service account for web application X or not, a mass update on 1000 rows of Table 3 every minute would not fit the usual system level model and trigger alerting, but if the system level model is aware of who is accessing that table at a rapid volume, it could identify the user(s) that exhibited the abnormal behavior (e.g. if a particular account accessing the table can be tied to an identifiable individual).

Access records may thus include, in some embodiments, data for particular ones of a plurality of components of an electronic resource information such as: one or more indications of when the particular component was previously accessed, one or more indications of particular user accounts used to access the particular component, or one or more indications of access locations associated with previous access attempts. System access model 240 may include expected system access profiles for ones of the plurality of components based on the access records, and identifying one or more access anomalies may be based on a comparison between the particular access indication to the expected system access profiles.

System Access Model—System Characteristic Data

System characteristic data may include a variety of information about the hardware and software that corresponds to an electronic device. This information can be helpful as it can be used to locate comparable systems within system access model 240. If a first system has identical or highly overlapping system characteristics with a second system, access data of one or more second systems may be more important (relevant) to determining if an anomaly has occurred relative to the first system. Consider a server cluster that includes 16 machines all with identical (or nearly identical) hardware and software that are all configured to process web page requests. These systems might be expected to have similar access profiles and thus various of the 16 systems may be highly useful to compare to one another to determine if an access anomaly has occurred.

System characteristic hardware information data can include number and type of storage devices, network interface devices, processors, cache and other rapid-access memory, display size, etc. Software information can include operating system type and version, network driver type and version (and other hardware drivers as well). Application data may also be included, such as names and versions of different software packages installed. System characteristic data can also include network location information, for example, whether a system is located on premises or in a remote cloud, and physical location data, such as what city, region, country, etc. a system is located in.

Like the user behavior model 230, system access model 240 can be built for one or many systems. System access model 240 can in some instances include multiple different models for multiple different systems and/or types of systems. One model type might apply to end-user desktop systems, for example, while another applies to server systems running web-facing application services. Any number of variations are possible in regard to the type and number of system models that may be used.

Note that for any particular electronic resource, corresponding data (e.g. access attempt data, access records, system characteristic data) may be used in building user behavior model 230, system access model 240, or both. In some instances, data for an electronic resource may also be excluded from being used to build user behavior model 230 and/or system access model 240. For example, a test system that is used with many different configurations and frequently re-purposed for different operations may be excluded, as such a system might not be useful (or even introduce confusion) in building machine learning based systems that can intelligently identify access anomalies. Such a data exclusion can be specified by a policy stored in the EDCS, or via one or more protocols designed to avoid data collection for such electronic resources (e.g. by not putting data collection agents on those devices).

In operation 330, according to some embodiments, EDCS 160 processes a particular access indication through user behavior model 230 and system access model 240, which can in some instances include performing a comparison using the access indication to one or both of those models (additional comparisons can also be performed in some embodiments). More particularly, operation 330 can include feeding the access indication (e.g. data regarding an access attempt) to processing engines 208, which then produce a result that can be analyzed by ML evaluation module 215 using a trained artificial neural network or other such model.

The analysis by machine learning (ML) evaluation module 215 can thus include running the access indication through one or more trained ML models (e.g. based on an artificial neural network, autoencoder, etc.) to compare data for the access indication to other previously collected data.

The results produced by running an access indication through a trained ML model may indicate how anomalous a particular access attempt is. By collecting massive amounts of data and then using this data to facilitate a model training process, the ML model can make a judgment as to whether an access attempt is anomalous in a way that would be impossible for a rules-based security system and/or human analysis.

Turning to operation 340 of FIG. 3, EDCS 160 identifies one or more access anomalies related to an electronic resource that has had an access attempt, according to some embodiments. These access anomalies may be identified based on results of processing an access indication through user behavior model 230 and/or system access model 240.

Identifying an access anomaly may include a determination that an access attempt is statistically unlikely (e.g. within a particular threshold). This determination threshold can be set to a pre-determined percentile such as 0.1% unlikelihood, or some other number, for example. Multiple different thresholds can be set for different types of access attempts, as well. For access to a highly controlled and important electronic resource (e.g. the master architectural designs for a company's next-generation microprocessor), an access attempt that has even a 10% or 20% unlikelihood might initiate a mitigation response. For heavily accessed resources (e.g., a networked file folder that is used by all employees in a company), the threshold might be set fairly low (e.g. 0.005% unlikelihood). Many different such thresholds are possible for different scenarios.

In operation 350, EDCS 160 uses a mitigation model to implement one or more mitigation actions responsive to the one or more identified access anomalies, according to various embodiments. Further, these mitigation actions may also be tracked to see what the results of the actions were, which can be used to refine a mitigation model.

Mitigation deployment module 220 may be used to implement mitigation actions, which may vary depending on the access attempt and outputs of the user behavior model 230 and system access model 240. If a user within a corporate intranet is attempting to access a file that is unusual (e.g., an attorney in the human resources department is attempting to access engineering plans for an upcoming but unreleased product), for example, one mitigation action would be to deny access to the file. Another mitigation action might be to alert one or more other company personnel (e.g. the attorney's supervisor, or an executive or senior developer who owns the unreleased product). Multiple mitigation actions may be deployed in parallel in some instances—for example, file access may be denied and an alert may also be sent to the attorney's supervisor.

Results of mitigation actions may also be tracked by mitigation deployment module 220 in various embodiments, and based on an evaluation of these results, a mitigation model can be updated with the goal of producing better mitigation outcomes in the future. Consider the above example of unusual file access on a corporate intranet by an attorney. In the event that file access was denied, this denial could be validated by the attorney's supervisor. For example, the supervisor could be sent an email saying "Attorney X was denied access to file Y at [date, time]. Please let us know if this mitigation action was believed to be proper." The supervisor could then click an HTML form (or other input mechanism) allowing the supervisor the options (1) "Yes, Attorney X should not have attempted to access this file", (2) "No, Attorney X should have been able to have access, and this access was denied improperly", or (3) "Unknown—I am unsure whether Attorney X should have had access." In the event that denial of file access was proper, the mitigation model can be updated to be more likely to deny file access in similar circumstances. Conversely, if the denial of access was incorrect, the mitigation model can be updated to make it less likely to deny similar access requests in the future. A result of "unknown" could result in no change, or further prompting (e.g. emailing the supervisor and Attorney X both at a later date to prompt the supervisor to investigate the issue further).

In another data access scenario in which a user process is reading data to and/or writing data from a database in unexpectedly large amounts, mitigation actions could include rate-limiting the user, disabling access entirely, and/or notifying IT personnel, security personnel, and/or management personnel. Likewise, after the mitigation action, stakeholders could be contacted to solicit feedback on whether the mitigation action was proper or not, resulting in updates to the mitigation model.

In some circumstances, evaluating mitigation results and updating a mitigation model may be performed automatically without human intervention. For example, if a user device is consuming too much bandwidth on a network (e.g., the access attempt being the use of network resources), a mitigation action could include capping the user's bandwidth to a specific level (e.g. 512 Kbps), along with an alert to the user that they have been limited. If the user does not complain within a specific timeframe (e.g. through a link provided in an email alert to the user), and the overall congestion on the network is also measured to be lower after the mitigation action is taken, then EDCS 160 can determine automatically that the mitigation action was successful, and update the mitigation model accordingly so that similar situations are more likely to garner a similar mitigation response. Conversely, if the user had a legitimate need for the bandwidth usage (e.g., possibly later verified by a supervisor or another decision maker), and the limitation thus impacted the user's job negatively, then the mitigation model could be updated indicating that the mitigation action produced a negative result (e.g., making the model less likely to attempt a similar action in the future in related circumstances). This self-learning allows for improved mitigation responses as time goes on and more input on mitigation results is gathered.

In one embodiment, user behavior model 230 indicates that a particular user account associated with a particular user is expected to be used to access an electronic resource from a particular location during a particular time period, where system access model 240 indicates that the particular user account is expected to be used to access particular components of the electronic resource. System access model 240 may indicate the user account is expected to access the electronic resource based on some threshold of probability being met based on various factors—e.g., the user account has accessed that resource in the past, or similarly situated users have accessed the resource (e.g., co-workers sharing a same job title/responsibility with the user). In this scenario, identifying one or more access anomalies can includes identifying a first anomaly when the particular user account is used to access the electronic resource at a different location than the particular location and identifying a second anomaly when the particular user account is used to access different components of the electronic resource than the particular components. In other words, if a user makes an access attempt for a resource at an unexpected location, this may cause an anomaly. Consider a user "BSmith" who routinely accesses an electronic resource (database "JKL") from San Jose, Calif. and from Phoenix, Ariz., but has never attempted to access that database when located in Moscow Russia, nor has any one of his co-workers under the same supervisor, nor has his supervisor herself attempted to access that database when their IP address indicates they are located outside of the United States. A rule-based system may simply see that BSmith has privilege access for database JKL, but an intelligent anomaly detector system can calculate that this is a (highly) unusual access pattern based on its models, and takes a mitigation action in response. Likewise, an access anomaly may be detected when a different component of a resource is accessed other than what may be typically expected (e.g. expected within some threshold probability level). If user B Smith routinely accesses TABLE_01 from database JKL and performs about 15 read-only accesses a week, it may be unusual to see user BSmith access TABLE_99 (a different component) from database JKL, and performs 120,000 write operations within a half hour span of time. Thus, such an action may be considered an anomaly, and cause a mitigation action to be taken.

Modeling and Training Examples

The training process for user behavior model 230 and system access module 240 may include accessing user data and system characteristic data from a number of different sources. In some instances, this data may also have an associated label attached to it—for example, an indication of whether a user access attempt (e.g., for an electronic resource) was believed to be legitimate or whether it was believed to be part of an attack. System characteristic data can also include an indication of whether it was associated with an attack—for example, log records from a firewall system might include information (either added at the time, or after the fact) specifying that communication packets sent to a network port were part of a denial of service (DoS), credential-stuffing, or other type of attack.

Example—Premises Security

Training user behavior model 230, in one example, may include building a model that can detect with some statistic certainty how unusual a particular access attempt is, relative to other access attempts. Consider the case of building access for a multinational company having locations in various countries across the globe. In this instance, many thousands of electronic badge access attempts may be made daily. For example, a user presents her badge having an RFID component in it to an RFID door scanner, which then allows the door to open or denies the door from opening, based on that user's access credentials.

Such a building security scheme may be set up by defining roles for different employees and contractors. A contractor might be given limited site access for one site between the hours of 8 am and 6:30 pm, weekdays only, for a period of three months time. A full-time accounting employee may be given limited site access to three different sites between 7 am and 7 pm, both weekends and weekdays, continuing indefinitely for the length of his employment. A security guard or IT staff might be given full site access to multiple sites, twenty-four hours a day, both weekends and weekdays (full access might include the ability to access even restricted places within a building, such as server rooms, power & utility rooms, etc., that the accounting employee would be prohibited from entering).

All such site access rules can be set up and defined in advance. In a simple rule-based scheme, however, there would not necessarily be any differentiation made between access attempts. An RFID badge scanner either lets someone in through a doorway if they meet the criteria defined in the rules, or is denied—it is a simple yes/no decision.

In a model-based system, however, a model can be trained to learn user access patterns and potentially indicate an alert (or take another mitigation action) in the event that something particularly unusual occurs. For example, assume a group of 50 IT staff members that all have full 24×7 unfettered site access to two sites, Site A and Site B.

Through analysis during the machine learning process, user behavior model 230 determines that there are three main clusters within the IT workers: cluster 1 consists of 30 workers of whom 99.9% of physical access attempts (via electronic RFID badge reader) are made only at Site A between 8:30 am and 4:30 pm (which might correspond to day shift at a primary location).

Cluster 2 is another 15 workers who have 98.5% of their access attempts at Site B between 4:00 pm and 12:30 am (which might correspond to second shift at a secondary location). Cluster 3 is the remaining 5 workers who have 97% of their access attempts occur at Site B between 12:00 am midnight and 8:30 am in the morning (e.g. third shift and secondary location).

Now, a worker from Cluster 1 makes an access attempt at Site B at 3:22 am to the building exterior, and then at 3:25 am to a data center storage room. User behavior model 230 can analyze characteristics of these access attempts, and see that all the users from Cluster 1 (e.g. day shift) have only three prior access attempts to that data center storage room between the hours of midnight at 8 am. User behavior model 230 can further determine that the accessing worker is a junior rank employee (e.g. level 1 worker), and that workers of that level have never accessed the data center storage room—only level 2 workers and above have previously accessed that room.

System access model 240 can also be trained using system access data, and the resulting trained model can tell us further information about the door access device to the data center storage room. That system model may indicate, for example that out of ~10,000 previous accesses to the data center storage room, 60% occur between 7 am and 6 pm, another 38% occur from 6 pm to 1am, and only 2% occur between 1am and 7 am.

Thus, even though the accessing worker is technically allowed by the specified access rules to enter the data center storage room in the middle of the night, user behavior model 230 can recognize that the present access attempt is statistically unlikely within a certain probability (e.g. three or more standard deviations out from typical behavior, although any other statistical measure could be used). System access model 240 can further indicate that the attempted access at 3:25 am to the data center room is also uncommon based on past usage.

The combination of the results from user behavior model 230 and system access model 240 can thus indicate that the access attempt by the level 1 IT worker (who generally seems to work day shift) is highly unusual. A mitigation action can then be launched by mitigation deployment module 220. One mitigation action would be to deny the worker access to the room and send the worker a message that they must get approval from an on-duty security site supervisor at Site B before entry will be permitted. Another mitigation action could be allowing the IT worker access, but sending one or more alerts to his supervisor or others in the company (e.g. on-site security personnel) informing them of the unusual access. The EDCS 160 does not need to have to guess or make a judgment as to why the access attempt may be problematic—for example, whether the user is attempting to steal company data or equipment, whether the user may be trying to modify company equipment in unauthorized fashion, or whether (non-problematically) the IT worker was specially assigned to do an urgent late-night project. Instead, ML evaluation module 215 simply allows the system to reach a decision based on synthesis of results from the user behavior model 230 and the system access model 240.

Example—Data Access

In another example, user behavior model 230 and system access model 240 can be trained in a way that allows an intelligent alert (or other mitigation action) to be issued regarding data access.

The training process for system access model 240 may include building a model that relates to data access on one or more particular computer systems, as explained below.

Consider a computer system ("DBS") that hosts a database. In this example, the DBS has employee generated (internal based) data, externally generated customer data (e.g., data originating from actions external to the company), and internal human resources data, among others.

The data within the DBS, in this example, is accessed by a number of different end users. Consumers (e.g., non-employees) may access data in the DBS via a web interface (such as a web-based application). Employees, each having different roles within a company, may also access various data in the DBS.

Access records for the DBS can include information about which tables were accessed by a particular end user. This access record information may include details such as number of database rows or columns read, whether data was written and/or read, etc. Query records may indicate which database queries were executed, and when. Such information may be collected over a period of time, which can reveal patterns that the system access model 240 can learn via the training process.

Thus, after training, system access model 240 may learn a pattern such as consumers (e.g., external end users) have in the last 30 days accessed a table DB_TABLE_01 an average of 40,000 times per day. Of these 40,000 accesses, 65% are database reads and 35% are database writes. EDCS 160 may then observe that as of 12 p.m. (i.e., halfway through the day), DB_TABLE_01 has been accessed 150,000 times by external users (e.g., web interface) and 95% of the accesses are database reads. This represents statistically aberrant behavior, and may indicate some kind of database exploit or compromise (e.g., perhaps there is a newly discovered flaw in the web interface that is allowing malicious users to download data they should not have access to). In such a case, a mitigation action could include rate-limiting the database, requiring step-up authentication for all external DB accesses, and/or alerting personnel to the DB access anomaly.

Model Building Using Machine Learning

As explained above, user behavior model 230 and system access model 240 may be trained using various machine learning techniques.

In one embodiment, user behavior model 230 is built using an autoencoder, based on a first plurality of indications of previous access attempts by a plurality of users for a first plurality of electronic resources. The autoencoder may be trained to calculate the similarity of a given access attempt for a given electronic resource relative to other ones of the previous access attempts by the plurality of users for the first plurality of electronic resources. More particularly, the autoencoder, through analyzing various data, can learn similarities of various access attempts and determine whether a given access attempt appears to be anomalous (i.e., statistically unlike other access attempts).

Data used to train the autoencoder may vary widely, and can include information such as time of access attempt, geographical location of user attempting access, software installed on a system making the access attempt, software installed on a system to which access is being attempted, username or other user identifier, privileges and/or roles of the user (e.g., employee, vendor, merchant, customer, anonymous public internet user; company department (e.g., legal, accounting, HR, warehouse staff, senior executive, etc.)). Data for the autoencoder can include functionality of software being accessed (e.g., reviewing previous electronic payment transactions, initiating a new electronic payment transaction, changing account contact information such as updating an account billing and/or mailing address, phone number, and/or email address). Such data may thus include many types of information about the user and electronic resources they attempt to access. Other examples of such data may be found variously herein. Autoencoders, while described relative to user behavior model 230, may also be used for other modeling (e.g. system access model 240). Likewise, the artificial neural network described below for system access model 240 may also be used in user behavior model 230, if desired.

In one embodiment, EDCS 160 builds system access model 240 based on system characteristic data and access records corresponding to a second plurality of electronic resources. These electronic resources may be identical to a first plurality of electronic resources used in building user behavior model 230, but may also differ (e.g., there may be partial but not total overlap between these data sources for the two models).

Building system access model 240 may comprise training an artificial neural network (ANN) to output a similarity score, using system characteristic data and access records, for a given access attempt for a given electronic resource, the similarity score being indicative of a similarity of the given access attempt for the given electronic resource to other ones of the previous access attempts by the plurality of users for the first plurality of electronic resources.

Inputs to the ANN may thus include system characteristic data like number and type of storage devices, network interface devices, processors, cache and other rapid-access memory, display size, etc. Software information can include operating system type and version, network driver type and version (and other hardware drivers as well). Application data may also be included, such as names and versions of different software packages installed. System characteristic data can also include network location information, for example, whether a system is located on premises or in a remote cloud, and physical location data, such as what city, region, country, etc. a system is located in. System characteristic data is not limited to such data, however.

Inputs to the ANN may thus also include access records from a system. This data may include logs of file accesses, application accesses, and network ports accessed (e.g. packets sent to a particular TCP/IP port, UDP port, or other port on a system). Access records can include dates and times and other information for data modifications made on a system, and dates and times particular functionality within a software was used. Access records can include records of user identities used to access a system (e.g., if a UNIX user logged into a system using secure shell (SSH), that user ID may be captured as part of an access record).

By manipulating hidden layer neurons during the ANN training process, the ANN can be trained to better recognize whether a given access attempt associated with an electronic resource is similar to other access attempts. An access attempt that resembles (e.g., has shared characteristics, including associated access records and system characteristic data) with other previous access attempts will have a higher output similarity score. If a similarity score for an access attempt is low enough (e.g., below a threshold), then the access attempt may be considered to be an access anomaly that necessitates a mitigation action.

In a further embodiment, EDCS 160 may re-train an artificial neural network (e.g., used for system access model 240) based on based on updated system characteristic data and updated access records corresponding to a third plurality of electronic resources. Note that this third plurality of electronic resources may not be identical to a first plurality of electronic resources involved in initially building user behavior model 230 or a second plurality of electronic resources involved in initially building system access model 240, in various embodiments. The data used to update the system access model 240, for example, can come from some of the same resources previously used, may omit some of the previously resources used, and may include new resources (e.g., a newly installed server machine, desktop, building RFID door, etc.) that were not previously used. In this fashion, system access model 240 can be further updated to reflect changing electronic resources and access patterns, as entities desiring enhanced electronic security may not have static resource configurations, but instead, configurations that periodically change.

Computer-Readable Medium

Figure 4:
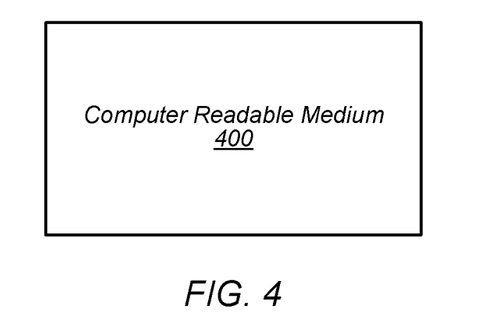
FIG. 4 is a diagram of a computer readable medium, according to some embodiments.

Turning to FIG. 4 a block diagram of one embodiment of a computer-readable medium 400 is shown. This computer-readable medium may store instructions corresponding to the operations of FIG. 3 and/or any techniques described herein. Thus, in one embodiment, instructions corresponding to EDCS 160 may be stored on computer-readable medium 400.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 5:
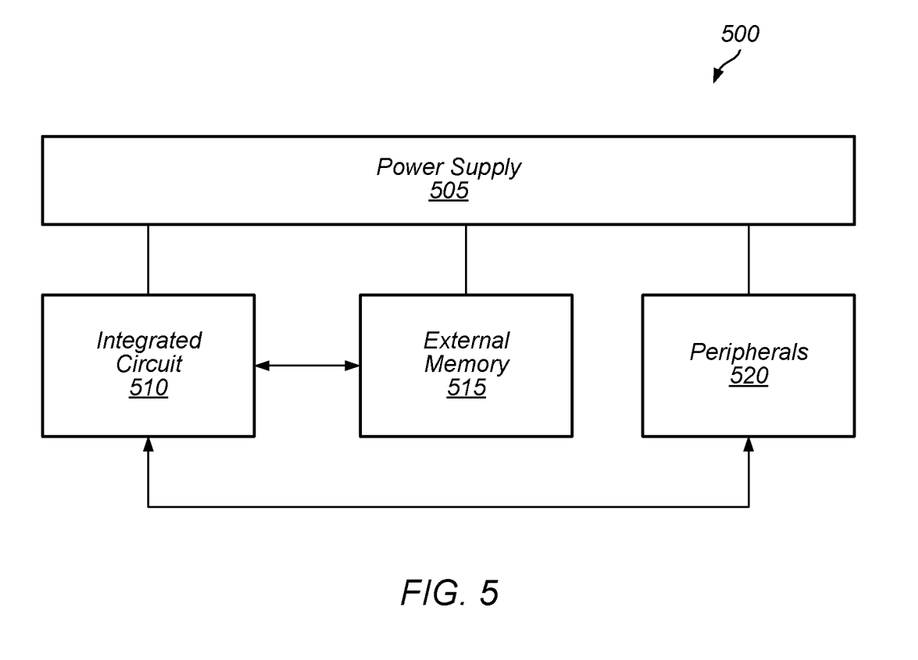
FIG. 5 is a block diagram of a system, according to some embodiments.

In FIG. 5, one embodiment of a computer system 500 is illustrated. Various embodiments of this system may be included EDCS 160 or any other computer system.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g. personal digital assistant (PDA), smart phone, etc.) and the peripherals 520 may include devices for various types of wireless communication, such as Wi-fi, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices. By way of further explanation, in some embodiments system 500 may include multiple computers or computing nodes that are configured to communicate together (e.g. computing cluster, server pool, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computer system, an access indication of a particular access attempt to access a particular electronic resource by a particular user;
   responsive to the receiving the access indication, the computer system accessing:
   a user behavior model generated based on user behavior patterns derived from previously-received indications of previous access attempts by a plurality of different users for accessing a plurality of different electronic resources, wherein the plurality of different users have different user attributes, and
   a system access model generated based on access patterns derived from access records associated with the plurality of different electronic resources, wherein the plurality of different electronic resources have different system characteristics;
   analyzing, by the computer system, the access indication using the user behavior model and the system access model, wherein the analyzing comprises determining that the particular access attempt corresponds to a first user behavior pattern associated with one or more users having one or more common user attributes with the particular user and determining that the particular access attempt corresponds to a first access pattern associated with one or more electronic resources having one or more common system characteristics with the particular electronic resource;

based on a result of the analyzing the access indication using the user behavior model and the system access model, the computer system identifying one or more access anomalies related to the particular access attempt to access the particular electronic resource; and implementing, by the computer system, one or more mitigation actions based on the one or more access anomalies.

2. The method of claim 1, wherein the plurality of different electronic resources includes at least two different types of electronic resources, the at least two different types of electronic resources comprising at least two of a network communications port, a computer file, a database table, or an operational database including data for a plurality of users.

3. The method of claim 1, wherein the plurality of different users includes at least two users with a differing attribute including at least one of: a geographical location, a user identifier, user account privileges, or a membership in a particular company department.

4. The method of claim 1, wherein the previously-received indications of previous access attempts include:
a user identifier corresponding to a user account associated with the access attempt, a user level of access identifier associated with the user account, a device identifier corresponding to a particular device used to attempt access, a time period associated with the access attempt, an access location associated with the access attempt, or a result of the access attempt,
wherein the user behavior model includes expected user access profiles for one or more of the plurality of users based on the previously-received indications, and
wherein the identifying the one or more access anomalies is based on a comparison between the particular access indication to the expected user access profiles.

5. The method of claim 1, wherein the particular electronic resource includes a plurality of components, wherein the access records include: one or more indications of when a particular component was previously accessed, one or more first indications of particular user accounts used to access the particular component, one or more second indications of access locations associated with previous access attempts,
wherein the system access model includes expected system access profiles for one of more of the plurality of components based on the access records, and
wherein the identifying the one or more access anomalies is based on a comparison between the particular access indication to the expected system access profiles.

6. The method of claim 1, wherein the one or more mitigation actions include one or more of granting partial access to the electronic resource, denying access to the electronic resource, requiring additional verification from the particular user, or transmitting an alert to an entity other than the particular user.

7. The method of claim 1, wherein the access indication is for an access by an internal user to a database containing transactional information for a plurality of users of an electronic transaction service.

8. The method of claim 1, wherein the user behavior model and the system access model were created using one or more machine learning algorithms, and wherein the method further comprises:
updating at least one of the user behavior model or the system access model based on additional access attempt data for one or more of the plurality of electronic resources.

9. The method of claim 1, wherein the computer system comprises one or more computing devices of an entity, wherein the electronic resource is a resource connected to an intranet of the entity, and wherein the particular user is an employee or contractor of the entity.

10. A non-transitory computer-readable medium storing instructions that when executed by a computer system cause the computer system to perform operations comprising:
receiving an access indication of a particular access attempt to access a particular electronic resource by a particular user;
responsive to the receiving the access indication, accessing:
a user behavior model generated based on user behavior patterns derived from previously-received indications of previous access attempts by a plurality of different users for accessing a plurality of different electronic resources, wherein the plurality of different users have different user attributes, and
a system access model generated based on access patterns derived from access records associated with the plurality of different electronic resources, wherein the plurality of different electronic resources have different system characteristics;
analyzing the access indication using the user behavior model and the system access model, wherein the analyzing comprises determining that the particular access attempt corresponds to a first user behavior pattern associated with one or more users having one or more common user attributes with the particular user and determining that the particular access attempt corresponds to a first access pattern associated with one or more electronic resources having one or more common system characteristics with the particular electronic resource;
based on a result of the analyzing the access indication using the user behavior model and the system access model, identifying one or more access anomalies related to the particular access attempt to access the particular electronic resource; and
implementing one or more mitigation actions based on the one or more access anomalies.

11. The non-transitory computer-readable medium of claim 10, wherein the operations further comprise:
electronically receiving human feedback regarding a result of the implemented one or more mitigation actions, wherein the human feedback is not from the particular user; and
updating a mitigation model based on the human feedback, wherein the updating causes the mitigation model more likely or less likely to select the one or more mitigation actions for a future access attempt to the electronic resource that shares characteristics with the particular access attempt.

12. The non-transitory computer-readable medium of claim 10, wherein the operations further comprise excluding data for a plurality of access attempts to an identified electronic resource when building at least one of the user behavior model or the system access model.

13. The non-transitory computer-readable medium of claim 10, wherein the electronic resource includes a plurality of components, wherein the access records include: one or more first indications of when a particular component was previously accessed, one or more second indications of particular user accounts used to access the particular component, and one or more third indications of access locations associated with previous access attempts.

14. The non-transitory computer-readable medium of claim 10, wherein the one or more mitigation actions include one or more of granting partial access to the electronic resource, denying access to the electronic resource, requiring additional verification from the particular user, or transmitting an alert to an entity other than the particular user.

15. The non-transitory computer-readable medium of claim 10, wherein the electronic resource comprises at least one of a computer file, a relational database, an RFID operated device configured to provide physical access, a file directory, a software application executing locally on a computer system, or a network-based application configured to provide a functionality to users via the Internet.

16. A system, comprising:
one or more hardware processors; and
a non-transitory memory having stored thereon instructions that are executable by the one or more processors to cause the system to perform operations comprising:
receiving an access indication of a particular access attempt to access a particular electronic resource by a particular user;
responsive to the receiving the access indication, accessing:
a user behavior model generated based on user behavior patterns derived from previously-received indications of previous access attempts by a plurality of different users for accessing a plurality of different electronic resources, wherein the plurality of different users have different user attributes, and
a system access model generated based on access patterns derived from access records associated with the plurality of different electronic resources, wherein the plurality of different electronic resources have different system characteristics;
analyzing the access indication using the user behavior model and the system access model, wherein the analyzing comprises determining that the particular access attempt corresponds to a first user behavior pattern associated with one or more users having one or more common user attributes with the particular user and determining that the particular access attempt corresponds to a first access pattern associated with one or more electronic resources having one or more common system characteristics with the particular electronic resource;
based on a result of the analyzing the access indication using the user behavior model and the system access model, identifying one or more access anomalies related to the particular access attempt to access the particular electronic resource; and
implementing one or more mitigation actions based on the one or more access anomalies.

17. The system of claim 16, wherein the operations further comprise building the user behavior model comprising training an autoencoder to calculate a similarity of a given access attempt for a given electronic resource relative to other ones of the previous access attempts by the plurality of users for the plurality of different electronic resources.

18. The system of claim 16, wherein the operations further comprise building the system access model comprising training an artificial neural network to output a similarity score, the similarity score being indicative of a similarity of a given access attempt for a given electronic resource to other ones of the previous access attempts by the plurality of users for the plurality of different electronic resources.

19. The system of claim 16, wherein the access indication is for an access by an internal user to a database containing transactional information for a plurality of users of an electronic transaction service.

20. The system of claim 18, wherein the operations further comprise:
denying the particular access attempt based on a location within an entity data storage system of data corresponding to the access attempt.

* * * * *